United States Patent
Farley et al.

(10) Patent No.: US 6,424,265 B2
(45) Date of Patent: *Jul. 23, 2002

(54) MAGNETIC STEERING WHEEL MOVEMENT SENSING DEVICE

(76) Inventors: G. Kirk Farley, 3649 Roxburgh Ct. North, Indianapolis, IN (US) 46234; Charles D. Angert, 4628 Woodsorrel Ct., Colorado Springs, CO (US) 80917

( * ) Notice: Subject to any disclaimer, the term of this patent is extended or adjusted under 35 U.S.C. 154(b) by 0 days.

This patent is subject to a terminal disclaimer.

(21) Appl. No.: 09/730,715

(22) Filed: Dec. 6, 2000

Related U.S. Application Data

(63) Continuation of application No. 09/270,718, filed on Mar. 17, 1999, now Pat. No. 6,198,397.

(51) Int. Cl.$^7$ .............................................. G08B 23/00
(52) U.S. Cl. ...................... 340/576; 340/575; 340/463; 200/61.54
(58) Field of Search .................................. 340/576, 575, 340/463, 671; 335/207; 200/61.54

(56) References Cited

U.S. PATENT DOCUMENTS

| | | | | |
|---|---|---|---|---|
| 3,559,205 A | * | 1/1971 | Colby | 340/575 |
| 3,735,298 A | * | 5/1973 | Colby | 340/463 |
| 4,142,152 A | * | 2/1979 | Fincher | 340/463 |
| 4,185,279 A | * | 1/1980 | Bachman | 340/671 |
| 4,365,121 A | * | 12/1982 | Morita et al. | 200/61.54 |
| 6,198,397 B1 | * | 3/2001 | Angert et al. | 340/576 |

* cited by examiner

*Primary Examiner*—John Tweel
(74) *Attorney, Agent, or Firm*—Kyle S. Brant

(57) ABSTRACT

A steering wheel movement detection device has a magnetic flux source and a magnetic sensor. The magnetic sensor is mounted on the steering column and the magnetic flux source is attached to the steering shaft or steering wheel and moves in accordance therewith. The magnetic flux source has lines or bands of varying magnetic flux. The magnetic sensing device is mounted adjacent and opposing the magnetic flux source so that when the steering wheel moves varying magnetic flux impinges upon the magnetic sensing device. The magnetic sensing device forms the inductive component of a resonant LC tank circuit and the frequency of that circuit varies in accordance with the flux impinging on the sensing device. A microcontroller integrates or averages the varying frequency signal over brief periods of time and when the average frequency does not have sufficient deviations an alarm signal is produced. A speaker is driven by the alarm signal to signal the driver to a state of alertness. A cruise control deactivation signal is also produced by the apparatus to disengage cruise control mode when driver alertness is in question.

2 Claims, 4 Drawing Sheets

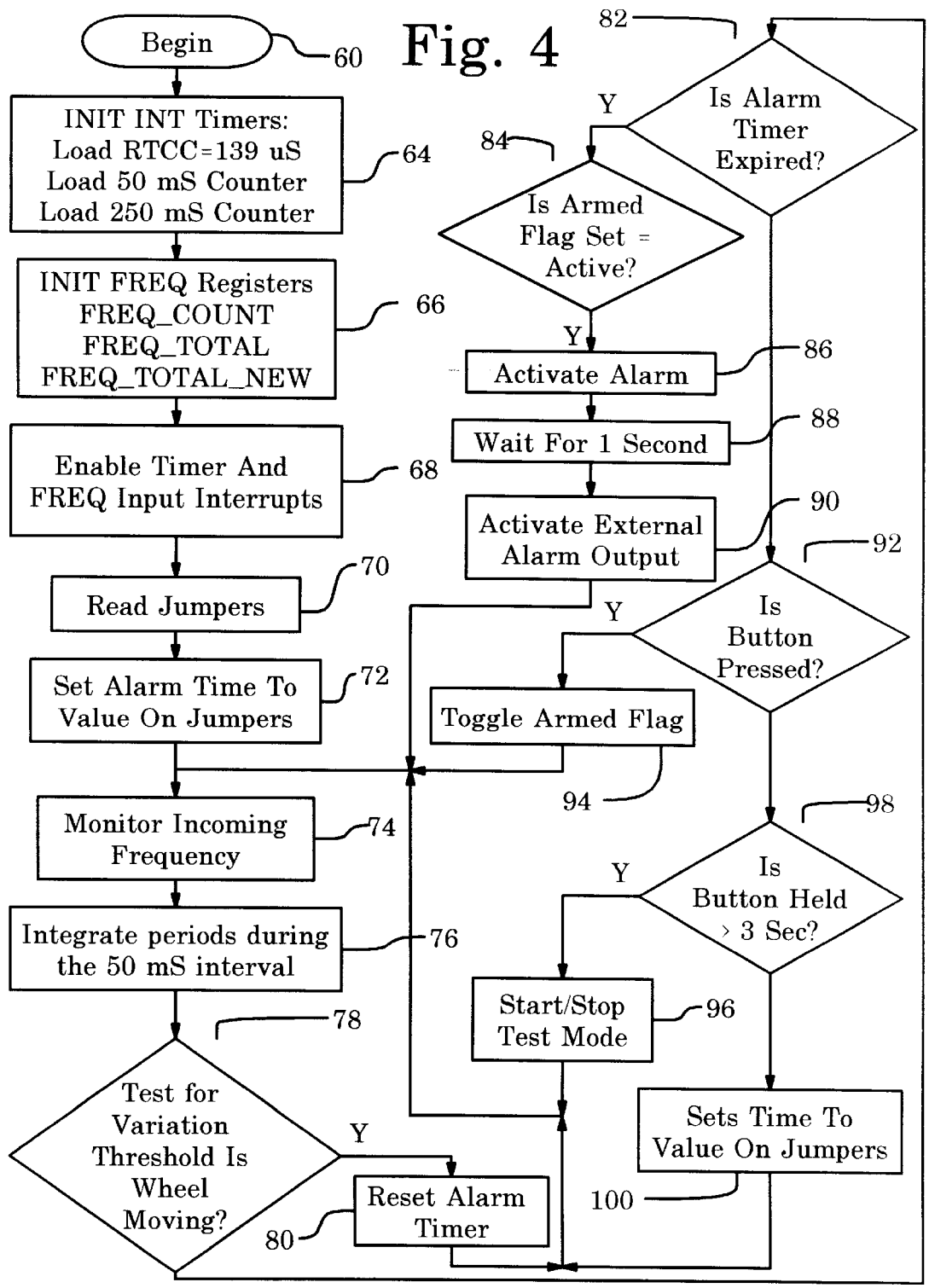

MAGNETIC STEERING WHEEL MOVEMENT SENSING DEVICE

RELATED APPLICATION INFORMATION

This application is a continuation of my application Ser. No. 09/270,718, filed Mar. 17, 1999, now U.S. Pat. No. 6,198,397.

FIELD OF THE INVENTION

This invention is in the field of vehicle steering and speed sensitive devices to detect a lack of driver alertness and emit a warning thereupon.

BACKGROUND OF THE INVENTION

Numerous systems are known that sense vehicle steering corrections during a given time period as an indication of driver alertness. One such system is disclosed in U.S. Pat. No. 4,278,969 to Richard Woods, entitled "Driver Warning System". The '969 Woods device incorporates a light source and photocell mounted on the steering column that directs a light beam towards a strip having alternate bands of reflective and non-reflective material. During normal driving patterns, the steering wheel is corrected a given number of times during any predetermined time period. When steering corrections fall below the predetermined number, the driver is usually inattentive due to any of a number of reasons. An audible driver warning system during such conditions has been shown to be effective to arouse the driver to a state of alertness to prevent a vehicle accident. For example, the Woods system is coupled with vehicle speed sensing devices which make it inoperative below a certain vehicle speed so that when the vehicle is parked or moving at a relatively slow speed, the audible alarm will not be sounded even though the necessary steering corrections are not made within the given time period. One significant shortcoming of the Woods device is its reliance on optics for motion detection.

Optical devices used in a motor vehicle environment are subject to significant amounts of dirt, grime, grease and other likely contaminants. Such contaminants will likely interfere with and prevent the Woods device from functioning properly. A steering wheel movement detection device that is unaffected by such contaminants is needed.

SUMMARY OF THE INVENTION

A steering wheel movement sensing apparatus for use with a vehicle having a steering shaft, according to one aspect of the present invention, comprises magnetic sensing means for detecting variations in magnetic flux, the magnetic sensing means attached at a fixed location within the vehicle in close proximity to the steering shaft, the magnetic sensing means producing a magnetic signal in accordance with the magnetic flux impinging thereon, a magnetic strip having varying magnetic flux lines, the magnetic strip attached to the steering shaft and in close proximity to the magnetic sensing means so that magnetic flux emanating from the magnetic strip impinge upon the magnetic sensing means, and wherein the magnetic strip moves with respect to the magnetic sensing means when the steering shaft is rotated, circuit means responsive to the magnetic signal for producing an alarm signal in accordance with a lack of deviation in the magnetic signal, and alarm means responsive to the alarm signal for producing an audible sound in accordance with the alarm signal.

One object of the present invention is to provide an improved steering wheel movement detection device.

Another object of the present invention is to provide steering wheel movement detection device that is unaffected by contaminants normally encountered in a motor vehicle environment.

Yet another object of the present invention is to provide a more reliable and more economical steering wheel movement detection device.

BRIEF DESCRIPTION OF THE DRAWINGS

FIG. 4 is a flowchart for the program executed by microcontroller 24 of FIGS. 1 and 2.

DESCRIPTION OF THE PREFERRED EMBODIMENTS

Figure 1:
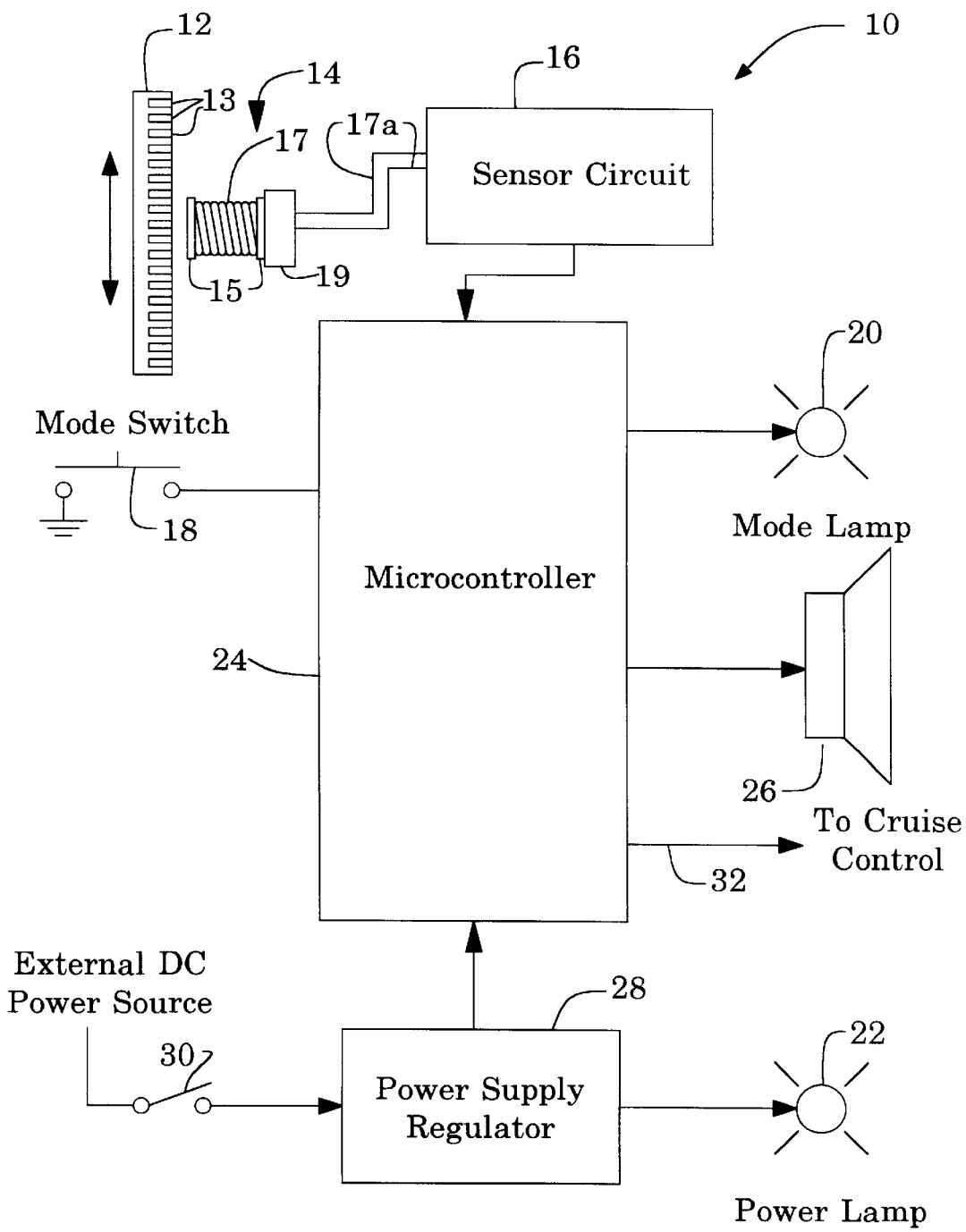
FIG. 1 is a block diagram of a steering wheel movement sensing device according to one aspect of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a block diagram of a magnetic steering wheel movement sensing device 10 according to the present invention is shown. Device 10 includes a magnetic strip 12, a magnetic sensor 14, a sensor circuit 16, a mode switch 18, a mode indicator or lamp 20, a power indicator or lamp 22, a microcontroller 24, a speaker 26, a power supply regulator 28 and a power switch 30. Magnetic strip 12 includes a plurality of magnetized areas 13 that produce a plurality of magnetic lines of flux emanating from strip 12. Magnetic sensor 14 includes a bobbin 15 about which a coil 17 is wound. Additionally, a magnet 19 is mechanically attached to bobbin 15 as shown. Bobbin 15 is made of ferrite or other known magnetic materials. Conductors 17a are the two leads from coil 17. Conductors 17a are connected to sensor circuit 16. Circuit 16 is shown in more detail in FIG. 3. Circuit 16 includes an oscillator circuit wherein the coil 17 provides the inductive component of the LC oscillator circuit. As magnetic strip 12 is moved with respect to sensor 14, the inductance of coil 17 is altered accordingly. Thus, the oscillator circuit of sensor circuit 16 will vary in frequency correspondingly with the magnetic flux lines from magnetic strip 12 that impinge upon sensor 14.

Sensor circuit 16 supplies an oscillator signal to microcontroller 24. Microcontroller 24 monitors the frequency signal from circuit 16 and produces an alarm signal supplied to speaker 26 when the deviation in frequency in the signal from circuit 16 fails to exceed a predetermined deviation over a predetermined time period. Mode switch 18 provides an input signal to microcontroller 24 so that microcontroller 24 is signaled or instructed to enter into an alternative mode of operation. Alternative modes of operation are useful during the installation process of device 10 into a motor vehicle. Mode light 20 receives an activation signal from microcontroller 24 to indicate the current mode of operation of the microcontroller. Switch 30 provides a mechanism to switch on and off the power supplied by an external DC power source (not shown). Power supply regulator 28 produces a regulated DC output signal used by microcontroller 24 and sensor circuit 16. Power lamp 22 receives a power signal from regulator 28. Power lamp 22 provides a visual indication that power is supplied to device 10.

Operationally speaking, magnetic strip 12 is attached to the steering shaft or steering wheel of a motor vehicle. Magnetic sensor 14 is mounted in a fixed position adjacent and in close proximity to magnetic strip 12. As the steering wheel or steering shaft is rotated, strip 12 is moved with respect to sensor 14 thereby causing a variation in the inductance of coil 17. Sensor circuit 16, which includes an LC oscillator circuit (FIG. 3) or tank circuit produces an oscillator signal that is supplied to microcontroller 24. As magnetic strip 12 moves versus the stationary sensor 14, the frequency of the signal produced by the circuit 16 varies in accordance with the flux impinging on the sensor from strip 12. Under normal driving conditions, microcontroller 24 monitors the oscillator signal from circuit 16 in a continuous fashion. Preferably, the period of the oscillator signal is averaged over a fixed period of time to determine a current frequency. Then, the period of the oscillator signal is averaged again over a second interval of time (for example 25–200 milliseconds), and compared with the previous average to ascertain whether sufficient deviation is detected. If the frequency deviation fails to exceed a predetermined deviation quantity over a three to five second period, then microcontroller 24 will produce an alarm signal supplied to speaker 26. Finally, a cruise control disable signal 32 is produced by microcontroller 24 when the alarm signal supplied to speaker 26 is produced. Signal 32 is connected to a cruise control device (not shown) to deactivate the cruise control device from "cruise" mode and begin deceleration of the vehicle when the lack of steering wheel movement indicates the driver may not be alert.

Figure 2:
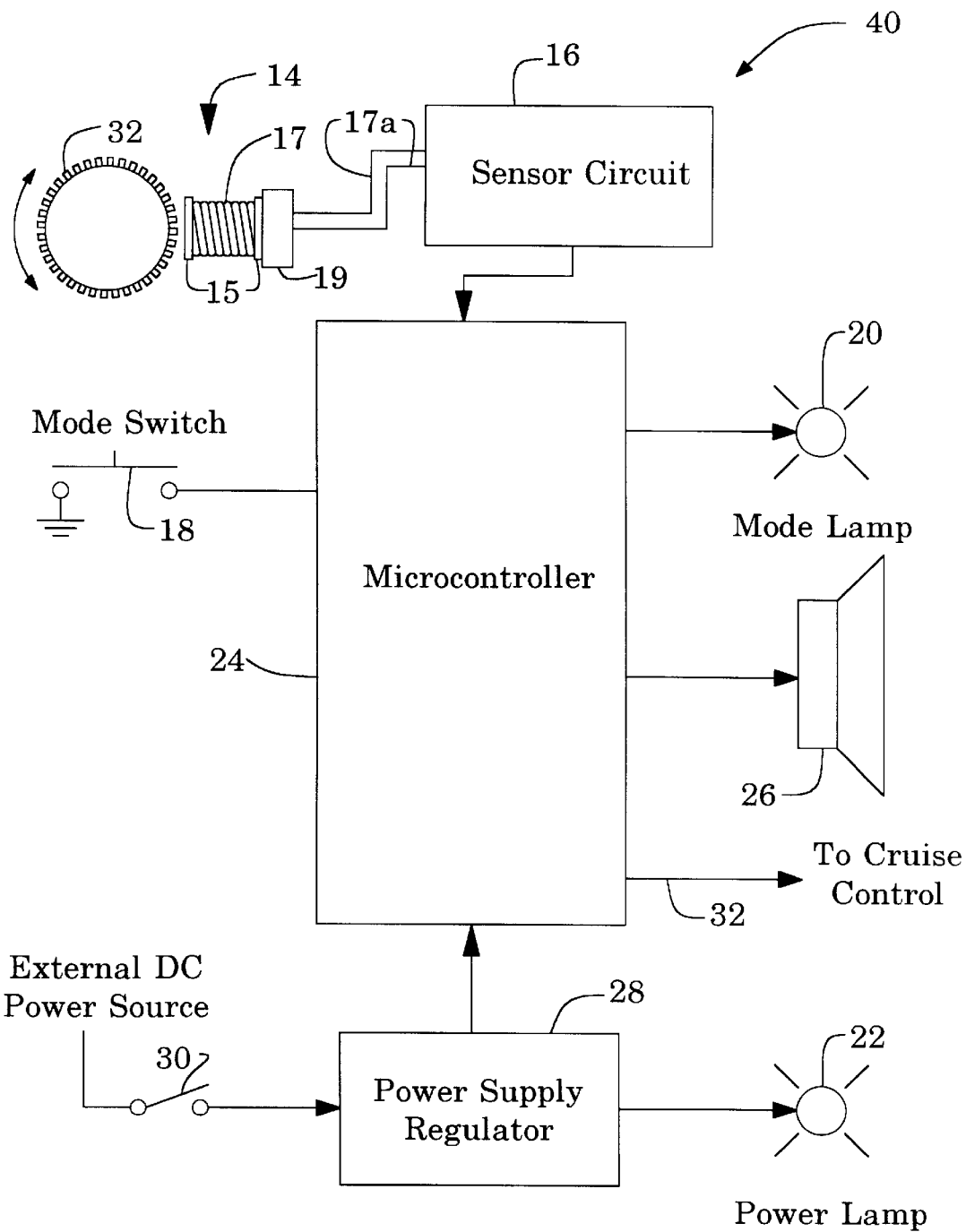
FIG. 2 is a block diagram of another embodiment of a steering wheel movement sensing device according to another aspect of the present invention.

Referring now to FIG. 2, another embodiment of a steering wheel movement sensing device 40 according to the present invention is shown. All of the components shown in FIG. 2 are identical with those shown in FIG. 1 with the exception of the toothed wheel 32. Wheel 32 takes the place of magnetic strip 12 in device 40. All components of FIG. 2 that are like numbered in FIG. 1 have the same characteristics and functionality as those device described with respect to device 10 of FIG. 1. The toothed wheel 32 provides an inductive interaction with sensor 14 so that small variations in the inductance of coil 17 are present on the leads 17a from coil 17. Leads 17a are connected into an LC tank circuit in sensor circuit 16. Toothed wheel 32 is mounted on or attached to the steering wheel or steering shaft of a motor vehicle and rotates in accordance with the steering shaft. In all other aspects of operation, device 40 is identical in functionality and components with device 10.

Figure 3:
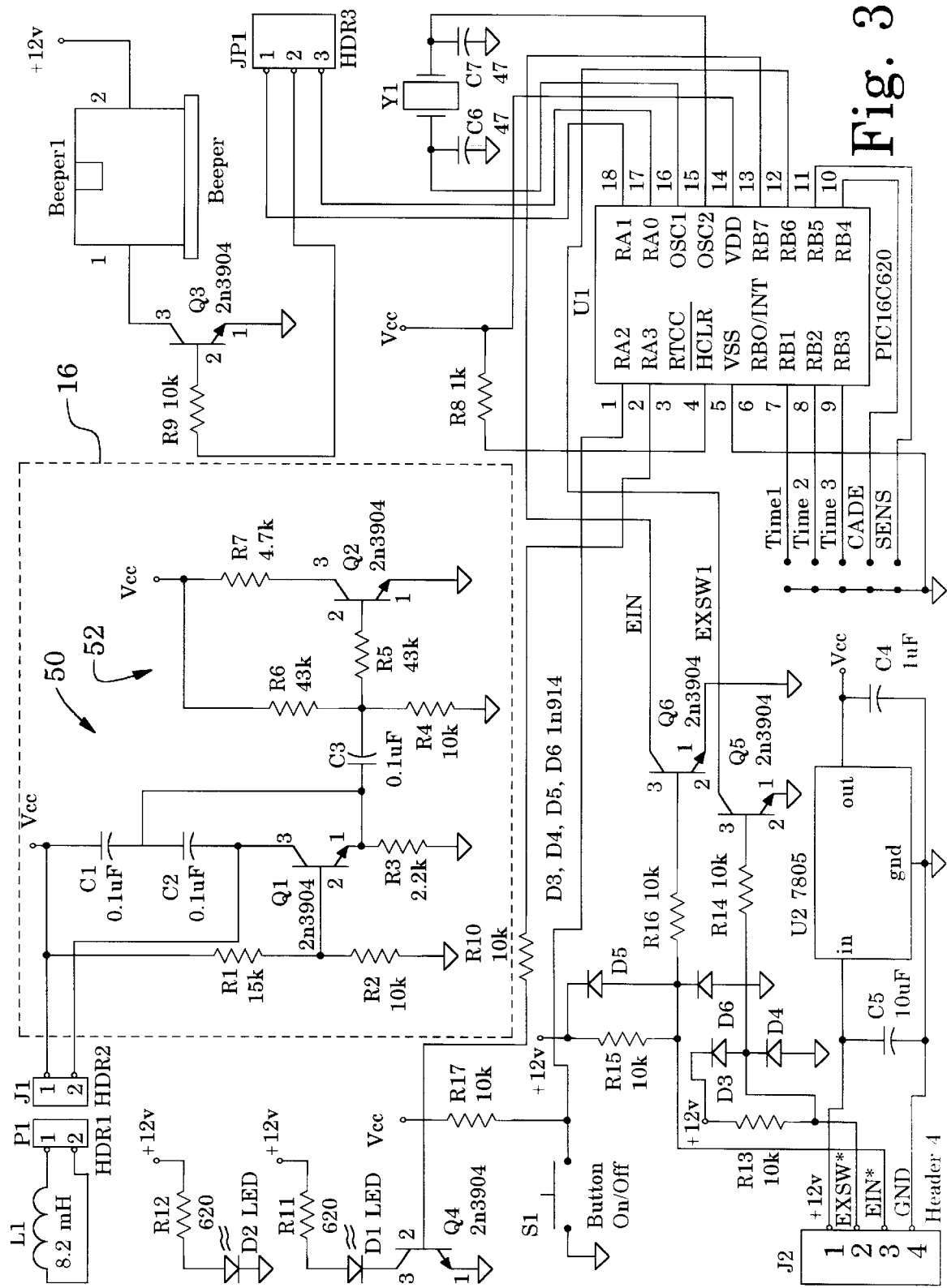
FIG. 3 is an electrical circuit schematic for the embodiments shown in FIGS. 1 and 2.

Referring now to FIG. 3, a schematic diagram of an electrical circuit used with the steering wheel movement sensing devices 10 and 40 is shown. Inductor L1 corresponds to coil 17 of FIGS. 1 and 2. Sensor circuit 16 is indicated by a broken line and includes an oscillator circuit 50 and a common emitter amplifier circuit 52. The oscillator circuit 50 is a traditional Colpitts oscillator well known in the art of electronics, and further discussion thereof is not necessary herein. Capacitor C1 and C2 and inductor L1 provide the LC components of the oscillator circuit 50. Resistors R1, R2 and R3 provide DC bias voltages to transistor Q1. The oscillator signal from circuit 50 passes through decoupling capacitor C3 and into the common emitter amplifier circuit 52 comprised of resistors R4, R5, R6 and R7 and transistor Q2. Resistors R4–R7. provide the DC bias voltages for amplifier transistor Q2. Amplifier circuit 52 is a high gain amplifier and transforms the oscillator signal delivered to the base of Q2 into a square wave signal.

The output of sensor circuit 16 is an approximately seven kilohertz frequency signal that is supplied to an input of microcontroller 24 indicated in FIG. 3 as U1. Microcontroller U1 received an input signal from switch S1 that corresponds with the mode switch 18 in FIGS. 1 and 2. LED D1 corresponds to the mode light 20 in FIGS. 1 and 2. LED D1 is illuminated or activated when microcontroller U1 detects insufficient frequency deviation in the oscillator signal from sensor circuit 16 in the aforementioned three-five second time period. Speaker 26 corresponds to the device labeled "beeper1" in FIG. 3. Microcontroller 24 provides two different output signals to jumper block JP1, and depending on the brand of speaker or beeper used, a short. is installed between pins 1 and 2 of JP1 or between pins 2 and 3 of JP1. Crystal Y1 and capacitors C6 and C7 provide an oscillator signal to microcontroller U1. U2 is a 5 volt regulator device well known in the electronics art for reducing a higher DC voltage such as that produced by a motor vehicle (+12 VDC) to the five volts DC required by microcontroller U1. Referring now to FIG. 4, a flowchart of the computer program executed by microcontroller 24 is shown. The flowchart begins at step 60. Next, at step 62, the input and output ports of the microcontroller are initialized to a predetermined desired state. At step 64, internal timers of the microcontroller are loaded with values so that a 50 millisecond and a 250 millisecond timer signal are produced. Next, at step 66, several registers or program variables are initialized. These include measured frequency registers, FREQ_COUNT variable, FREQ_TOTAL variable, FREQ_TOTAL variable, and a FREQ_TOTAL_NEW variable. Timer and frequency inputs interrupts are initialized next at step 68. At steps 70 and 72 program operational features are activated in accordance with the ground/floating state of the signals labeled TIME1, TIME2, TIME3, TIME4, CADE and SENS shown in the schematic of FIG. 3. For example, the TIME1, TIME2 and TIME3 inputs provide a 3-bit binary input to microcontroller 24 to establish 1 of 8 possible alarm duration periods (such as 1–8 seconds) that the alarm signal will be produced when the frequency deviation of the signal from sensor circuit 16 is less than a predetermined deviation limit (as determined by microcontroller 24). The CADE signal instructs the microcontroller 24 to produce either a continuous alarm signal or an intermittent alarm signal based upon the ground/floating state thereof. Finally, the sensitivity of sensor circuit 16 may vary from installation to installation (the minimum and maximum frequency produced by circuit 16) and the SENS signal instructs microcontroller 24 to establish a smaller or larger frequency deviation limit when testing the frequency of the signal from circuit 16.

The microcontroller program control loop begins at step 74. At step 76, the frequency signal from circuit 16 is detected and averaged over a 50 millisecond time period. Then, at step 78, the current frequency average is compared with the previously computed frequency average, and if the difference is greater than a predetermined value, program execution continues at step 80 and the alarm timer is reset. After step 80, program execution continues at step 74. If the comparison at step 78 results in a deviation in frequency that is less than the limit, then program execution will continue to step 82.

At step 82, the alarm timer is tested to ascertain whether it has expired. If so, then the program continues at step 84 where the state of the "armed flag" is checked. If the armed flag is active, then program execution continues at step 86. At step 86 the alarm is activated. Next, at step 88, the microcontroller pauses for one second. Then, at step 90, the microcontroller activates the external alarm output signal causing an alarm signal supplied to speaker 26. Program execution continues at step 74 following step 90.

If at step 82 the alarm timer has not expired, then program execution will continue with step 92. At step 92, microcontroller 24 detects whether switch S1 is pressed. Recall that switch S1 in the FIG. 3 schematic corresponds to the mode switch 18 in FIGS. 1 and 2. If at step 92 the switch is detected as pressed, then step 94 is executed and the toggle armed flag step is performed. Program execution continues at step 74 following step 94.

If the button is not pressed at step 92, then program execution continues at step 98. If at step 98 it is determined that the button has been pressed for more than three seconds, then step 96 is executed and the test mode operation of device 10 is toggled on or off, or activated/deactivated. Test mode causes microcontroller 24 to produce a feedback alarm signal useful in establishing the appropriate distance when installing the magnetic strip 12 and magnetic sensor 14 into a motor vehicle. Test mode provides continuous feedback in the form of audible short beeps from speaker 26 indicating to the installer that frequency deviations in the signal from sensor circuit 16 are being sensed by microcontroller 24. Following step 96 program execution returns to step 74.

If at step 98 the button has not been impressed for more than three seconds then step 100 is executed and the alarm time is set to the value on jumpers TIME1, TIME2 and TIME3.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A steering wheel movement sensing apparatus for use with a vehicle having a steering shaft, said apparatus comprising:

magnetic sensing means for detecting variations in magnetic flux, said magnetic sensing means attached at a fixed location within the vehicle in close proximity to said steering shaft, said magnetic sensing means producing a magnetic signal proportional to and in accordance with the magnetic flux impinging thereon;

a magnetic strip having varying magnetic flux lines, said magnetic strip attached to said steering shaft and in close proximity to said magnetic sensing means so that magnetic flux emanating from said magnetic strip impinge upon said magnetic sensing means, and wherein said magnetic strip moves with respect to said magnetic sensing means when the steering shaft is rotated;

circuit means responsive to said magnetic signal for producing an alarm signal in accordance with a lack of deviation in said magnetic signal; and alarm means responsive to said alarm signal for producing an audible sound in accordance with said alarm signal.

2. A steering wheel movement sensing apparatus for use with a vehicle having a steering shaft, said apparatus comprising:

magnetic sensing means for detecting variations in magnetic flux, said magnetic sensing means attached at a fixed location within the vehicle in close proximity to said steering shaft, said magnetic sensing means producing a magnetic signal proportional to and in accordance with the magnetic flux impinging thereon;

ferro-magnetic means attached to said steering shaft and in close proximity to said magnetic sensing means, and wherein said ferro-magnetic means moves with respect to said magnetic sensing means when the steering shaft is rotated;

circuit means responsive to said magnetic signal for producing an alarm signal in accordance with a lack of deviation in said magnetic signal; and alarm means responsive to said alarm signal for producing an audible sound in accordance with said alarm signal.

* * * * *